United States Patent [19]
Vera et al.

[11] Patent Number: 6,165,427
[45] Date of Patent: Dec. 26, 2000

[54] METHOD FOR REMOVAL OF HEAVY METALS FROM AQUEOUS SOLUTIONS USING SODIUM DI-(N-OCTYL) PHOSPHINATE OR SODIUM DI-(N-DODECYL) PHOSPHINATE

[75] Inventors: Juan H. Vera; Martin E. Weber, both of Quebec, Canada; Jamaleddin Esalah, Tripoli, Libyan Arab Jamahiriya

[73] Assignee: The Royal Institution For The Advancement of Learning (McGill University), Montreal, Canada

[21] Appl. No.: 09/379,176

[22] Filed: Aug. 23, 1999

[51] Int. Cl.[7] .......................... C22B 13/00; C22B 17/00; C22B 19/00
[52] U.S. Cl. .............................. 423/92; 423/101
[58] Field of Search ................ 423/92, 93, 101, 423/102

[56] References Cited

U.S. PATENT DOCUMENTS 4,124,462 11/1978 Reinhardt et al. .................. 423/101
4,511,541 4/1985 Bierman et al. .................... 423/101

FOREIGN PATENT DOCUMENTS 1308553 5/1987 U.S.S.R. ................................ 423/92

OTHER PUBLICATIONS

Husein et al., *Separation Science and Technology*, "Removal of Lead From Aqueous Solutions With Sodium Caprate", 33(12), pp. 1869–1904, 1988, no month.

Sastre, A.M., *Solvent Extraction and Ion Exchange*, "Extraction of Divalent Metals With BIS(2,4,4–Trimethylpentyl)Phosphinic Acid", 8(4&5), pp. 597–614 (1991), no month.

Elizalde, M. P., *Polyhedron*, "Extraction on Ni(II) From Nitrate Media by DI–n–Octylphosphinic Acid Dissolved in Toluene", vol. 6, pp. 1251–1254, 1987, no month.

Brooks, Clyde S., *Journal of Metals*, "Metal Recovery From Industrial Wastes", pp. 50–56, Jul. 1986.

Danesi et al., *Solvent Extraction and Ion Exchange*, "Selectivity–Structure Trends in the Extractio of Co(II) and Ni(II) By Dialkyl Phosphoric, Alkyl Alkylphosphonic, and Dialkylphosphinic Aicds", 3(4), pp. 435–452 (1985), no month.

Rickelton, W.A., *Solvent Extraction and Ion Exchange*, "Cobalt–Nickel Separation By Solvent Extraction With BIS(2,4,4 Trimethylpentyl)Phosphinic Acid", 2(6) pp. 815–832 (1984), no month.

Preston, J.S., *Hydrometallurgy*, Solven Extraction of Cobalt and Nickel By Organophosphorus Acid, I. Comparison of Phosphoric, Phophonic and Phosphonic Acid Systems, pp. 115–133, 9(1982), no month.

Peppard, D.F., *Inorg. Nucl. Chem.*, "Di–n–Octyl–Phosphonic Acid As a Selective Extractant For Metallic Cations", vol. 27, pp. 2065–2073, 1965, no month.

Williams, R. H., *Chemical Laboratories of Temple University*, Di–n–alkylphosphine Oxides, I. Synthesis, pp. 5418–5420, 1952, no month.

*Primary Examiner*—Steven Bos
*Attorney, Agent, or Firm*—Wilson, Sonsini, Goodrich & Rosati

[57] ABSTRACT

Provided herein is a method for the removal of soluble metal species consisting of lead, cadmium, zinc and mixtures thereof, present in an aqueous effluent, the method comprising the steps of: a) contacting the aqueous effluent with a organophosphorus salt selected from sodium di-(n-octyl) phosphinate and sodium di-(n-dodecyl) phosphinate or mixtures thereof; b) achieving precipitation of said soluble metal species by reaction with said organophosphorus salts to yield a precipitate; and c) recovering said precipitate by filtration. Preferably, the mole ratio of organophosphorus salt is about 1.5 to 2.5 and most preferably about 2, in relation to the total mole ratio of the said soluble metal species. Preferably, prior to step a), the pH of the aqueous effluent to be treated is adjusted to at least about 3 and most preferably at least about 4. Advantageously, the organophosphorus salt may be regenerated from the precipitate by treating the precipitate with concentrated aqueous sodium hydroxide to dissolve it and in then contacting the resulting solution with diethyl ether to extract the organophosphorus salt, followed by evaporation of the diethyl ether solvent.

8 Claims, 15 Drawing Sheets

METHOD FOR REMOVAL OF HEAVY METALS FROM AQUEOUS SOLUTIONS USING SODIUM DI-(N-OCTYL) PHOSPHINATE OR SODIUM DI-(N-DODECYL) PHOSPHINATE

BACKGROUND OF THE INVENTION

1. Field of Invention

This invention relates to heavy metalremoval from wastewater streams. More specifically the invention relates to the use of organic reactants to precipitate metals in solution.

2. The Prior Art

The use of organic reactants to precipitate metals in solution has been limited by poor regeneration of the reactants and the high costs of the reactants. Furthermore, large organic reactant consumption and poor settling and filtering properties are often encountered. In addition, the residual concentrations in the treated effluent often fail to meet applicable standards.

Organic reactants such as thioacetamide, dialkyl dithiocarbonates and starch xanthanes, have been proposed for the removal of soluble metals from waste effluents. [C. Brooks, Metal Recovery from Industrial Wastes, Journal of Metals, 38 (1986) 50.]

Husein et al. recently reported the use of compounds containing a sodium carboxylate group such as sodium caprate for the precipitation and removal of lead from aqueous solutions [M. Husein, J. Vera and M. Weber, Removal of Lead from Aqueous Solution with Sodium Caprate, Sep, Sci. Technol., 33 (1998) 1889.]

Meanwhile, organophosphorus reagents are known in solvent extraction. Solvent extraction is a separation technique wherein solubility characteristics are exploited to extract a given compound by dissolving it in a chosen solvent. Such reagents are considered suitable for the recovery and separation of cobalt and nickel from acidic leach solutions. [J. Preston, Solvent Extraction of Cobalt and Nickel by Organophosphorus Acids. I- Comparison of Phosphoric, Phosphonic and Phosphinic Acid Systems, Hydrometallurgy, 9 (1982) 115.] [P. Danesi, L. Reichley-Yinger, G. Mason, L. Kaplan, E. Horwitz and M. Diamond, Selectivity-Structure Trends in the Extraction of Co(II) and Ni(ll) by Dialkyl Phosphoric, Alkyl Phosphonic, and Dialkyl Phosphinic Acids, Solvent Extr. Ion Exch., 3 (1985) 435.]

However, the use of organophosphorus reagents and more specifically, sodium di-(n-octyl) phosphinate or sodium di-(n-dodecyl) phosphinate, have heretofore not been proposed for the recovery of lead, cadmium and zinc by precipitation. [W. Rickelton, Cobalt-Nickel Separation by Solvent Extraction with Bis(2,4,4-trimethyl pentyl phosphinic) acid, Solvent Extr. Ion Exch., 2 (1984) 815.] [A. Sastre, N. Meralles and E. Fignerola, Extraction of Divalent Metals with Bis(2, 4,4-trimethyl pentyl) Phosphinic Acid, Solvent Extr. Ion Exch., 8 (1990) 597.] [M. Elizalde, J. Castresana, M. Aguilar and M. Cox, Extraction of Ni (II) from Nitrate Media by Di-n-Octylphosphinic Acid Dissolved in Toluene, Polyhedron 6 (1987)1251.]

Thus, it is an object of this invention to provide a novel, cost efficient organic reagent for precipitation of lead, cadmium and zinc from aqueous streams.

SUMMARY OF THE INVENTION

It has been found that organophosphorus reagents, more specifically, sodium di-(n-octyl) phosphinate and sodium di-(n-dodecyl) phosphinate are excellent precipitating agents for the recovery of lead, cadmium and zinc species. Moreover, the reagents can be regenerated.

Thus, the present invention provides a method for the removal of soluble metal species consisting of lead, cadmium, zinc and mixtures thereof, present in an aqueous effluent, the method comprising the steps of:

a) contacting the aqueous effluent with a organophosphorus salt selected from sodium di-(n-octyl)phosphinate and sodium di-(n-dodecyl)phosphinate or mixtures thereof;

b) achieving precipitation of said soluble metal species by reaction with said organophosphorus salts to yield a precipitate; and c) recovering said precipitate by filtration.

Preferably, the mole ratio of organophosphorus salt is about 1.5 to 2.5 and most preferably about 2, in relation to the total mole ratio of the said soluble metal species.

Preferably, prior to step a), the pH of the aqueous effluent to be treated is adjusted to at least about 3 and most preferably at least about 4.

Advantageously, the organophosphorus salt may be regenerated from the precipitate by treating the precipitate with concentrated aqueous sodium hydroxide to dissolve it and in then contacting the resulting solution with diethyl ether to extract the organophosphorus salt, followed by evaporation of the diethyl ether solvent.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

Nomenclature

As used herein, the following symbols refer to:

$C_i$: concentration of species i, such as Pb, Cd, Zn, Ca, Na, Cl.

L: di-(n-octyl) phosphinate $L_D$: di-(n-dodecyl) phosphinate $L_L$: percentage loss of the precipitating agent.

pH: equilibrium pH $pH^\circ$: pH of the feed $r_{Ca}^\circ$: mole ratio of total calcium to total lead in the feed $r_{Cl}^\circ$: mole ratio of total chloride to total lead in the feed $r_L^\circ$: mole ratio of sodium di-(n-octyl) phosphinate added to the system to total lead in the feed $r_{L_D}^\circ$: mole ratio of sodium di-(n-dodecyl) phosphinate added to the system to total lead in the feed $r_{NO}^\circ$: mole ratio of total nitrate to total lead in the feed $R_{Ca}$: percentage removal of calcium $R_{Pb}$: percentage removal of lead NOTE: the superscript ° is used for the properties of the feed to distinguish them from the values at equilibrium.

$C_{Pb}^\circ$=5.5 mM, $pH^\circ$=4.2, $r_{NO_3}^\circ$=2.0, $C_{Ca}^\circ=C_{Na}^\circ=C_{Cl}^\circ$=0.

Figure 2:
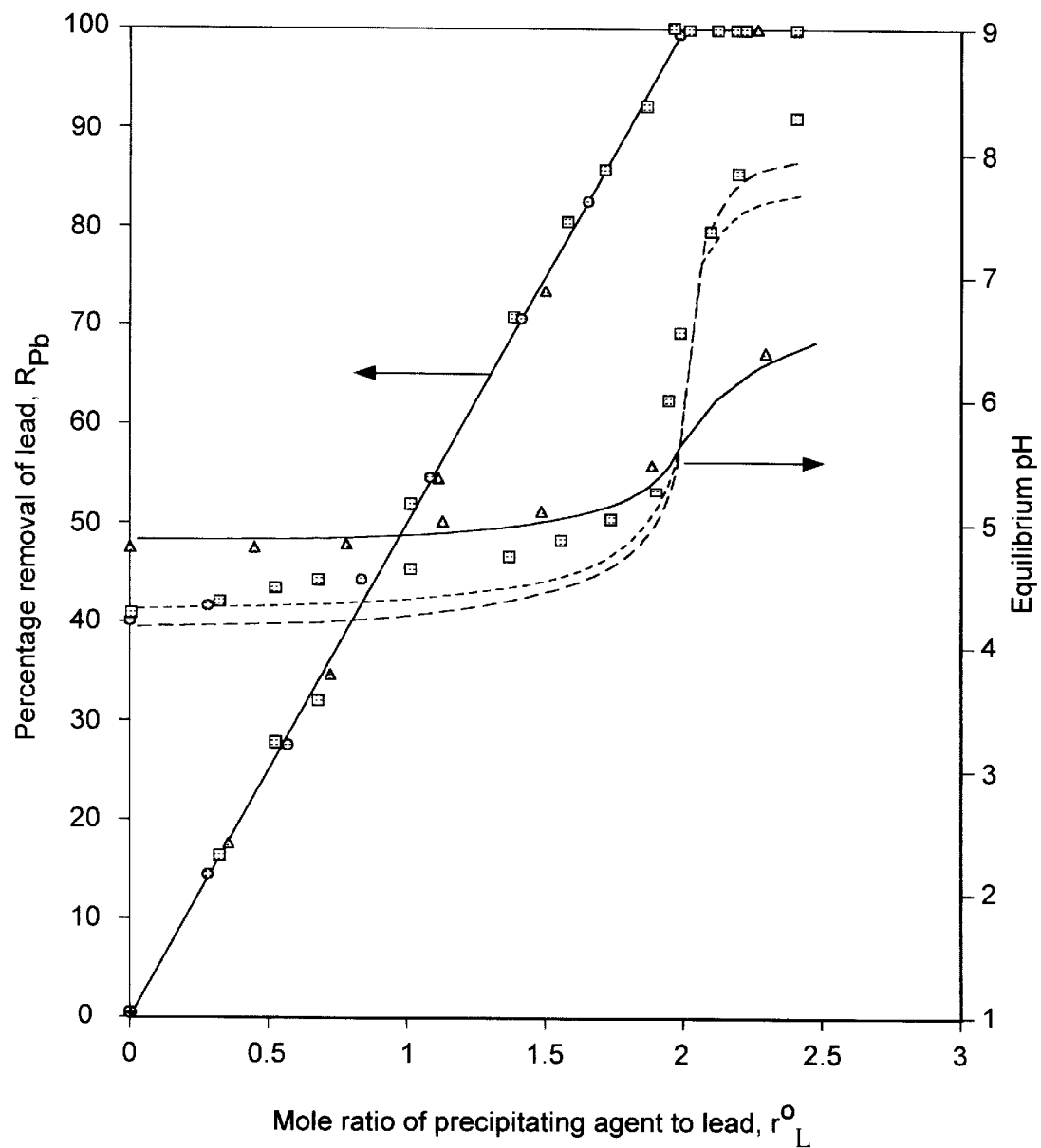

FIG. 2: Effect of mole ratio of sodium di(n-octyl) phosphinate to lead on the removal of lead, and the equilibrium pH, at different feed concentration of lead (▲, __) $C_{Pb}^{o}$=0.46 mM, pH°=4.6;
(■, _ _ _) $C_{Pb}^{o}$=5.5 mM, pH°=4.2;
(●, ←→) $C_{Pb}^{o}$=10.62 mM, pH°=4.1;
$r_{NO_3}^{o}$=2.0,
$C_{Ca}^{o}=C_{Na}^{o}=C_{Cl}^{o}$=0.

Figure 3:
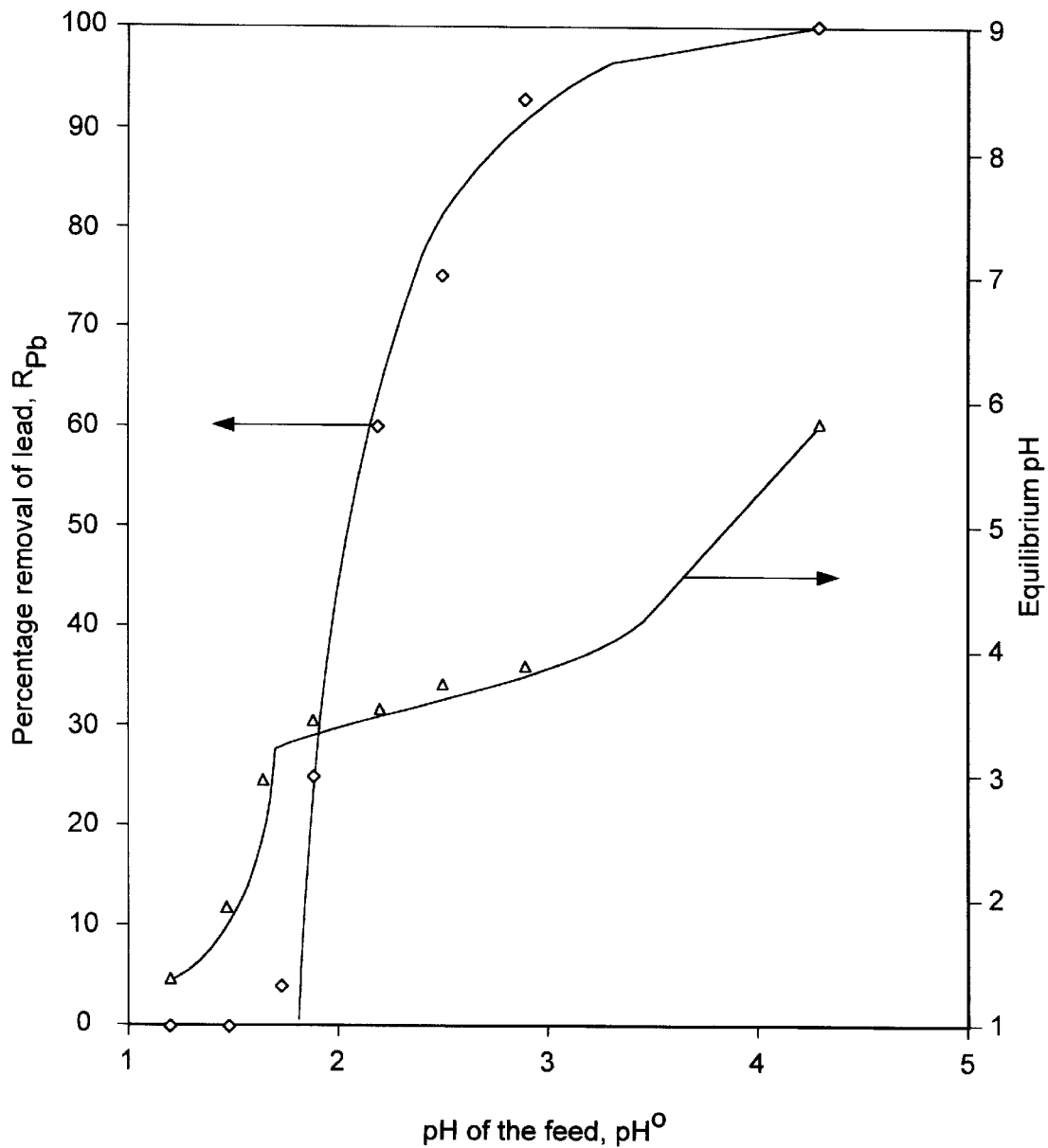

FIG. 3: Effect of feed pH on the removal of lead, and the equilibrium pH using sodium di-(n-octyl) phosphinate.

$C_{Pb}^{o}$=7.1 mM, $r_L^{o}$=2.0, $C_{Ca}^{o}=C_{Na}^{o}=C_{Cl}^{o}$=0.

Figure 4A:
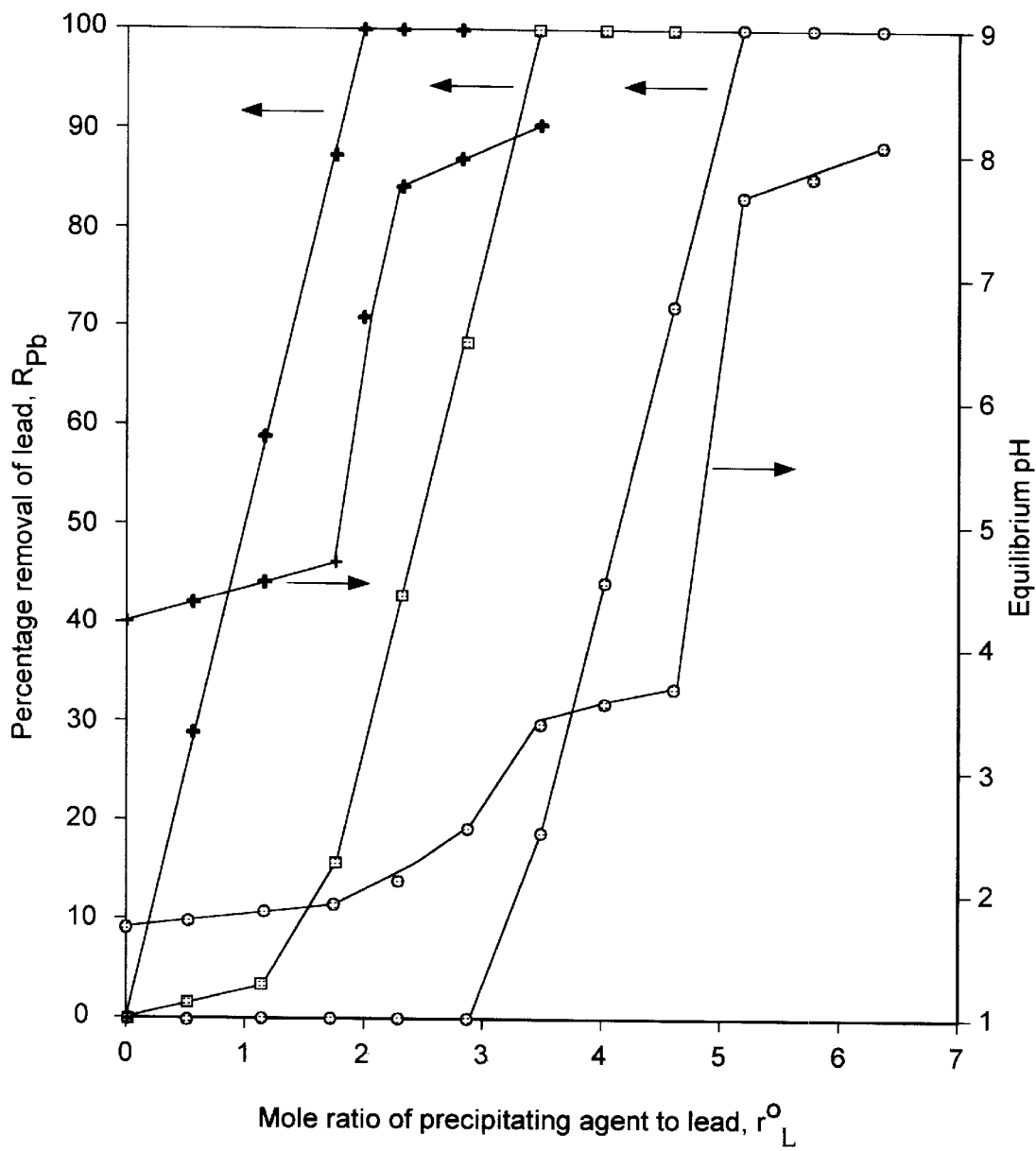
Figure 4B:
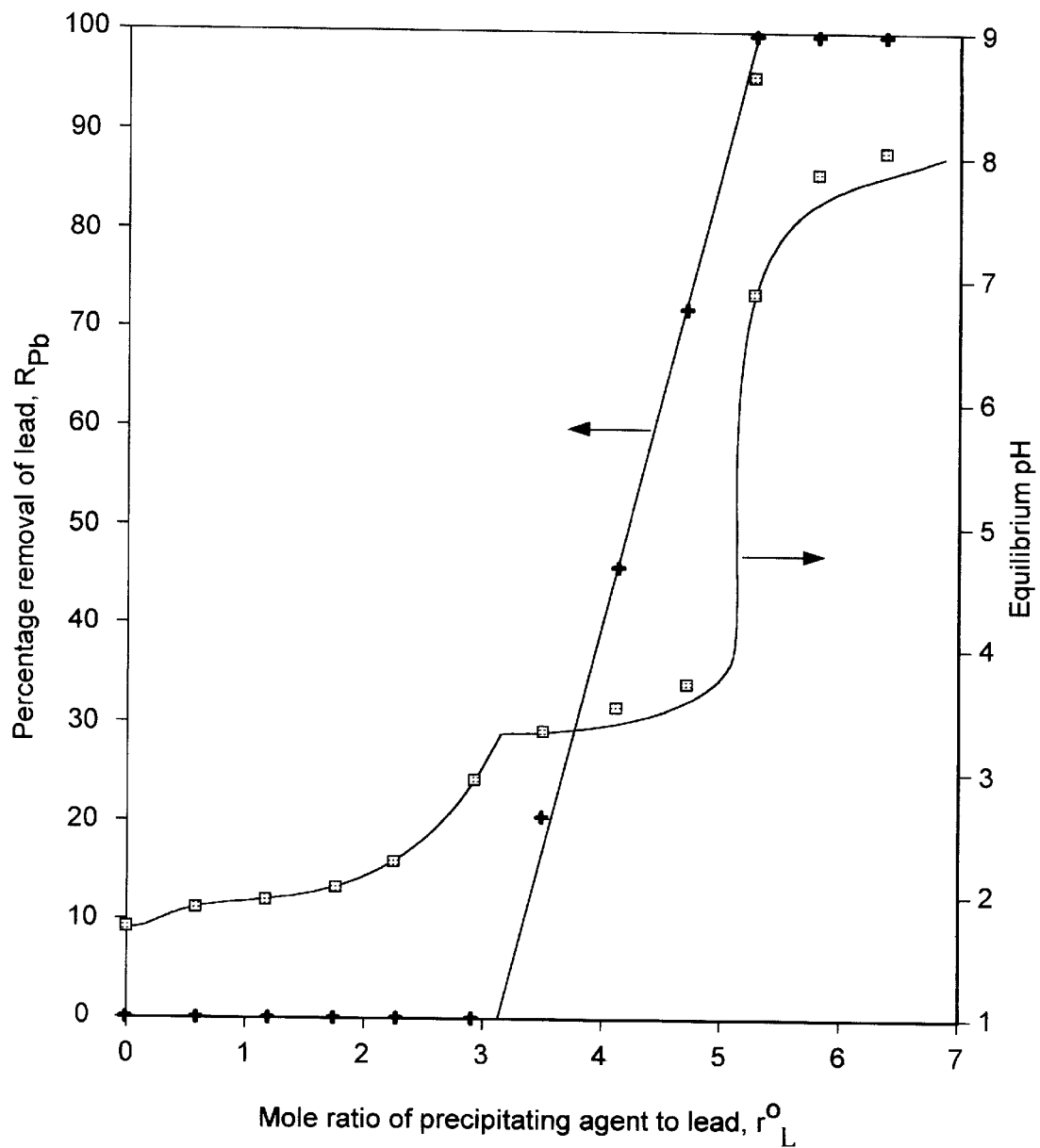

FIG. 4-a: Effect of mole ratio of sodium di(n-octyl) phosphinate on the removal of lead, and the equilibrium pH, at different feed pH.

$C_{Pb}^{o}$=6.75 mM, $C_{Ca}^{o}=C_{Na}^{o}=C_{Cl}^{o}$=0.

♦ pH°=4.1; # pH°=1.9; •pH°=1.6.

FIG. 4-b: Effect of mole ratio of sodium di(n-octyl) phosphinate on the removal of lead, and the equilibrium pH, in the presence of free acid.

$C_{Pb}^{o}$=6.75 mM, $C_{Ca}^{o}=C_{Na}^{o}=C_{Cl}^{o}$=0.

Figure 5:
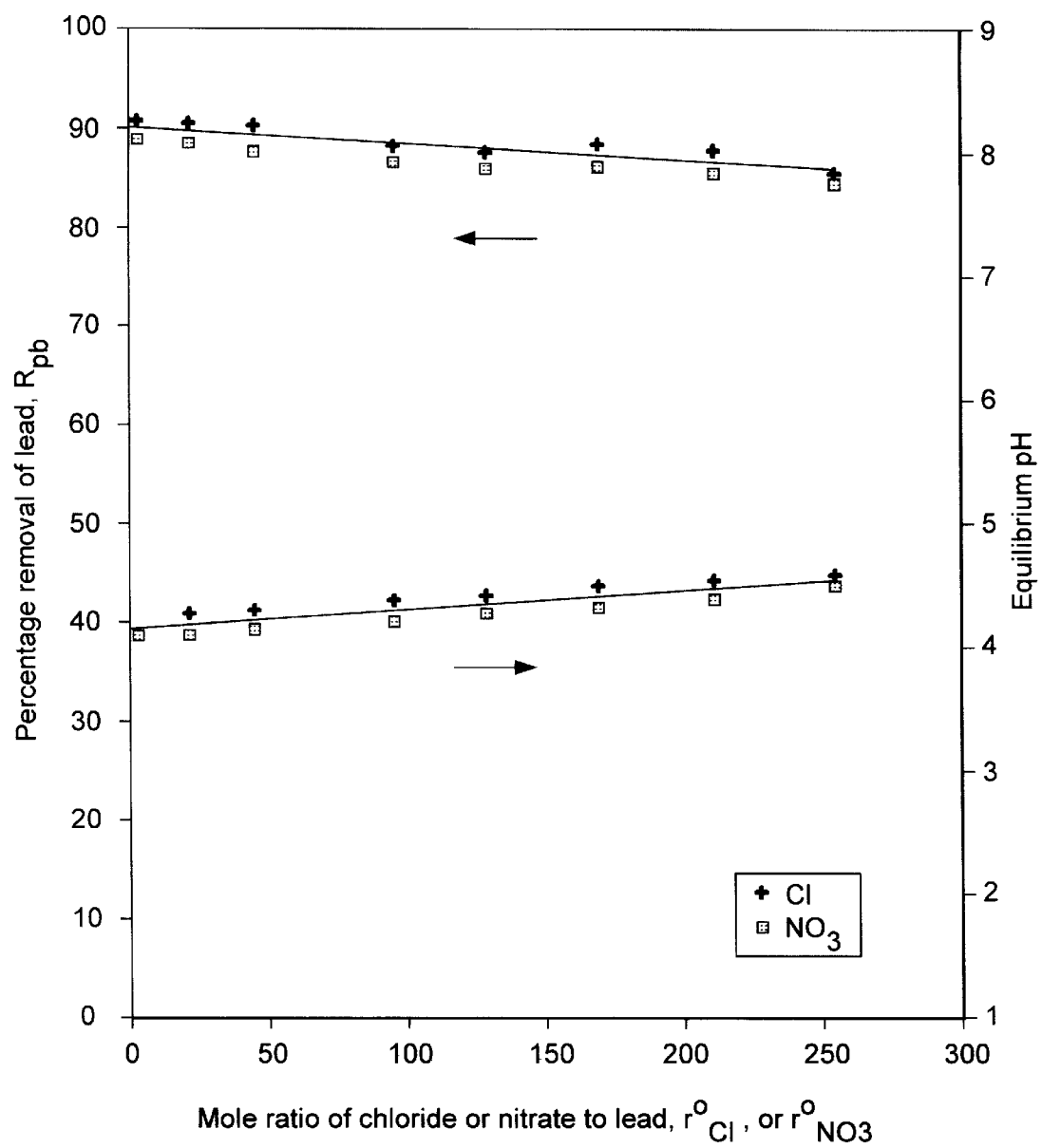

FIG. 5: Effect of chloride concentration (using NaCl) on the removal of lead, and the equilibrium pH using sodium di-(n-octyl) phosphinate.

$C_{Pb}^{o}$=6.85 mM, pH°=4.0, $r_L^{o}$=2.0, $C_{Ca}^{o}$=0

Figure 6:
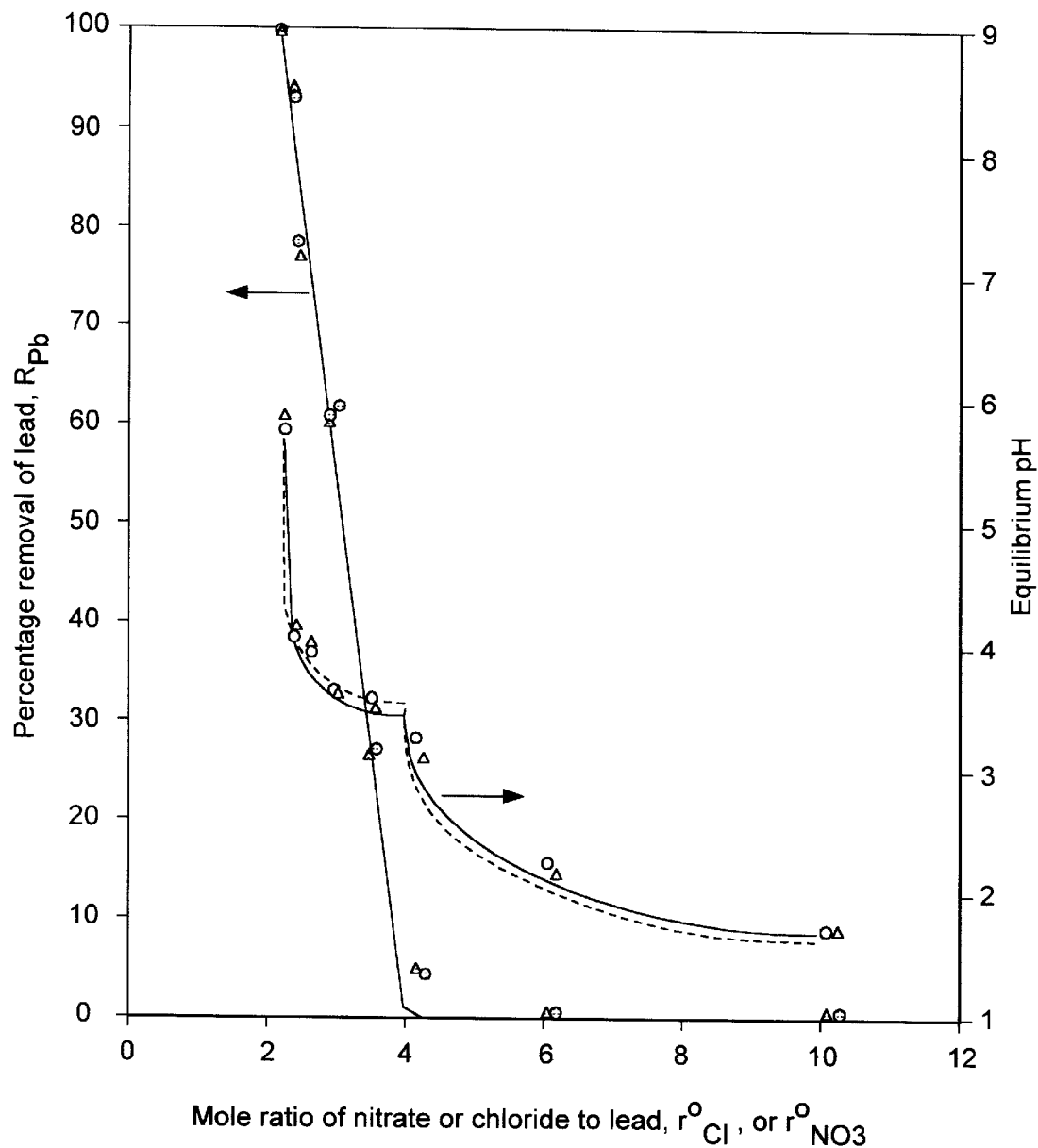

FIG. 6: Effect of chloride (using HCl) or nitrate (using $HNO_3$) on the removal of lead, and the equilibrium pH.

$C_{Pb}^{o}$=7.0 mM, $r_L^{o}$=2.0, $C_{Ca}^{o}=C_{Na}^{o}$=0.

Figure 7:
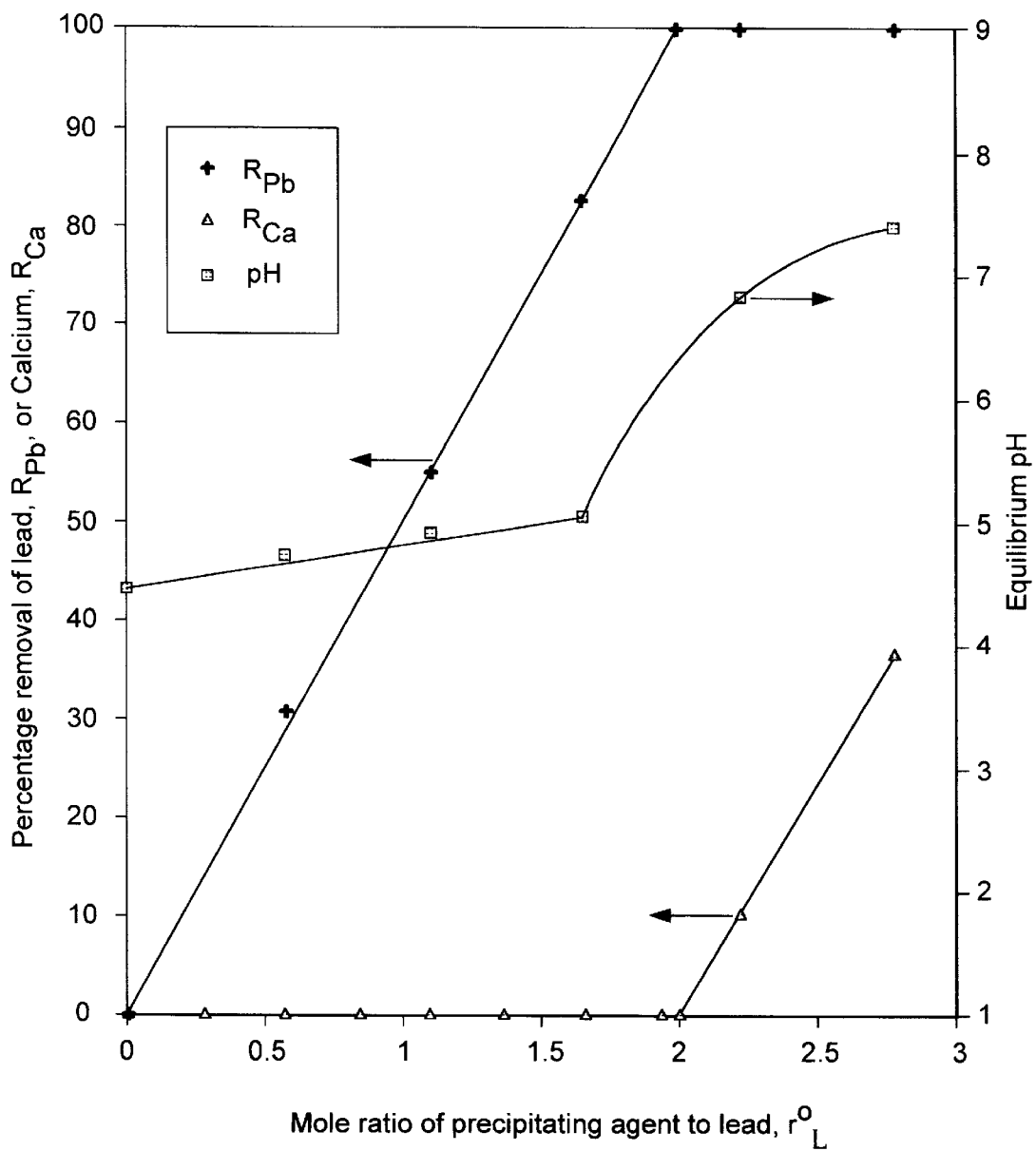

Cl: ●, O, __;

$NO_3$: ▲, Δ, . . . ;

FIG. 7: Effect of mole ratio of sodium di-(n-octyl) phosphinate to lead on the removal of lead, and the equilibrium pH, in the presence of calcium.

$C_{Pb}^{o}$=10mM, $r_{Ca}^{o}$=1.0, pH°=4.3, $r_{NO_3}^{o}$=4.0, $C_{Na}^{o}=C_{Cl}^{o}$=0

Figure 8:
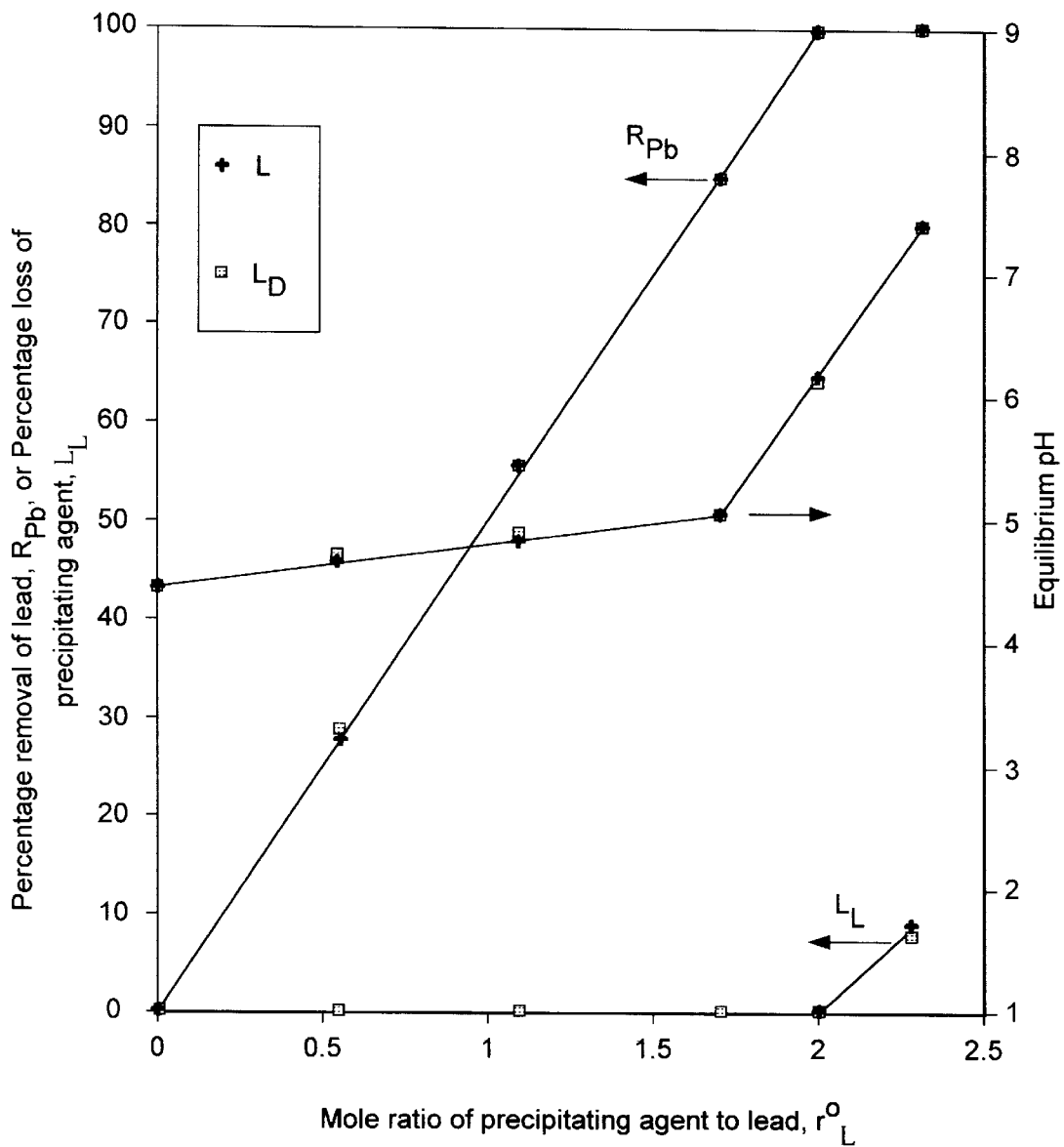

FIG. 8: Effect of mole ratio of sodium di-(n-alkyl) phosphinate to lead on the removal of lead, and the equilibrium pH.

$C_{Pb}^{o}$=4.97 mM, pH°=4.1, $r_{NO_3}^{o}$=2.0, $C_{Ca}^{o}=C_{Na}^{o}=C_{Cl}^{o}$=0

Figure 9:
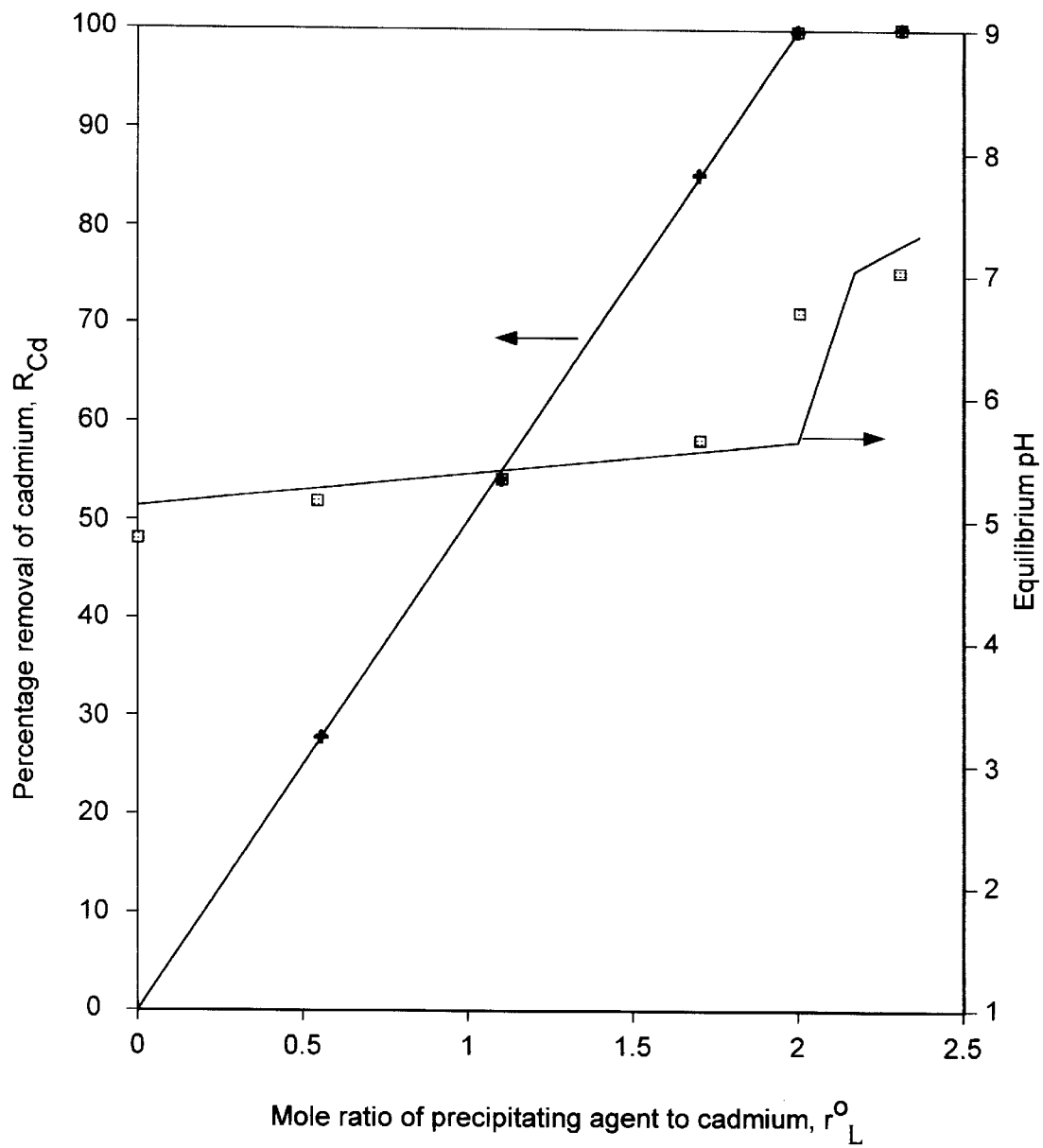

FIG. 9: Effect of mole ratio of sodium di-(n-octyl) phosphinate to cadmium on the removal of cadmium, and the equilibrium pH.

$C_{Cd}^{o}$=5.9 mM, pH°=4.7,
$r_{NO_3}^{o}$=2.0,
$C_{Ca}^{o}=C_{Na}^{o}=C_{Cl}^{o}$=0

Figure 10:
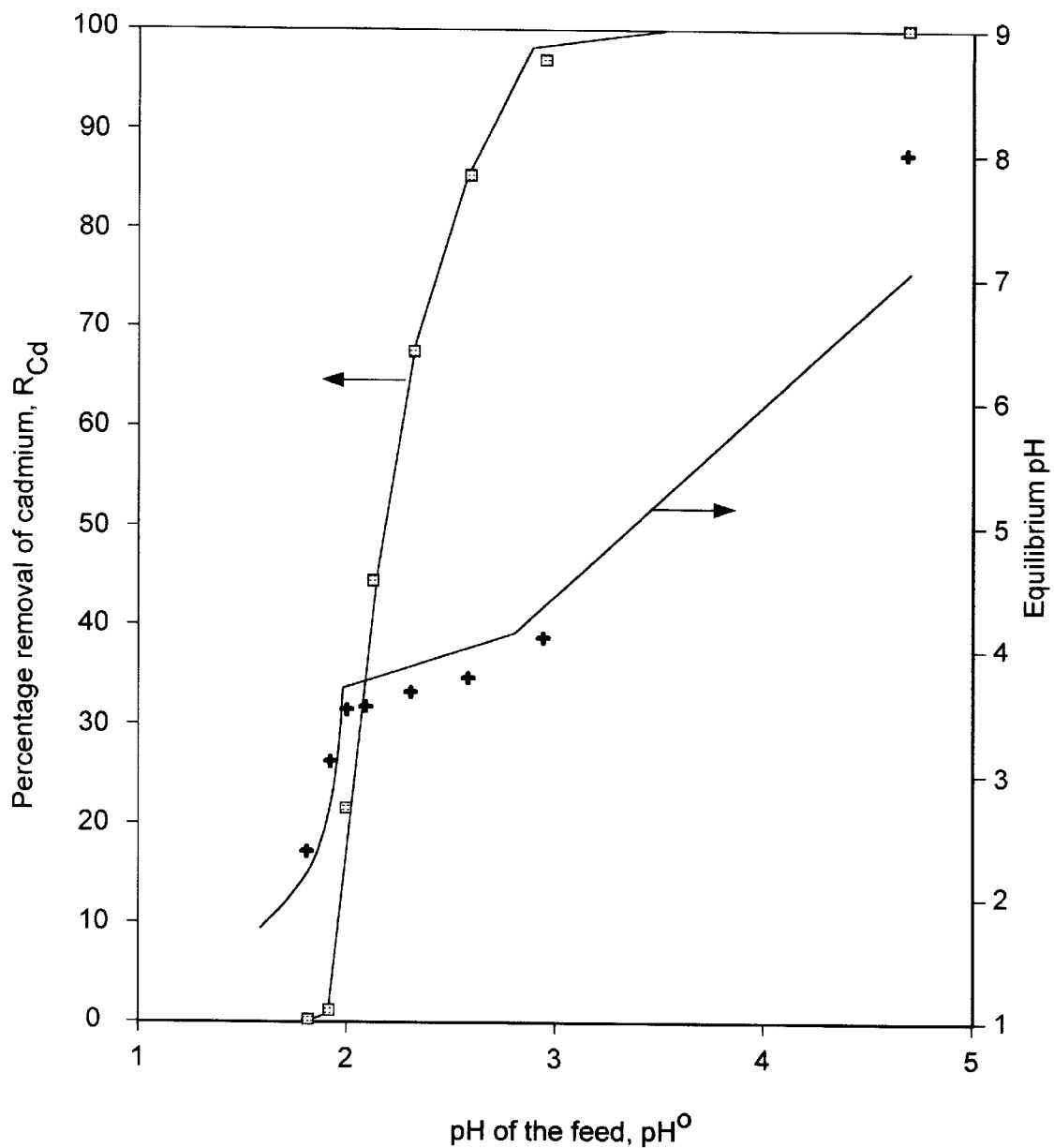

FIG. 10: Effect on feed pH on the removal of cadmium, and the equilibrium pH using sodium di-(n-octyl) phosphinate.

$C_{Cd}^{o}$=5.9 mM,
$r_L^{o}$=2.2
$C_{Pb}^{o}=C_{Ca}^{o}=C_{Na}^{o}=C_{Cl}^{o}$=0

Figure 11:
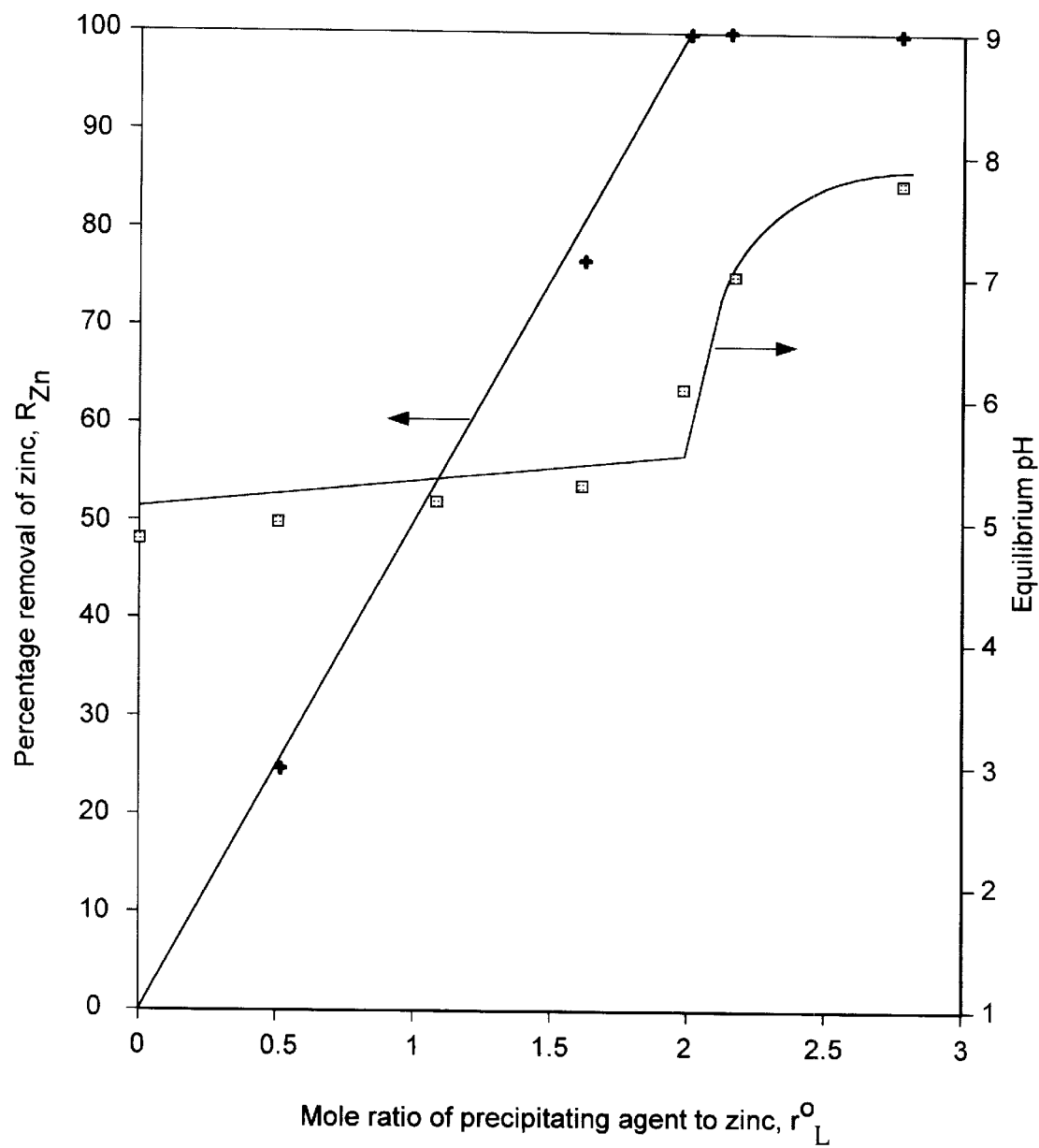

FIG. 11: Effect on mole ratio of sodium di-(n-octyl) phosphinate to zinc on the removal of zinc and the equilibrium pH.

$C_{Zn}^{o}$=6.3 mM, pH°=4.6,
$r_{NO_3}^{o}$=2.0,
$C_{Pb}^{o}=C_{Cd}^{o}=C_{Ca}^{o}=C_{Na}^{o}=C_{Cl}^{o}$=0

Figure 12:
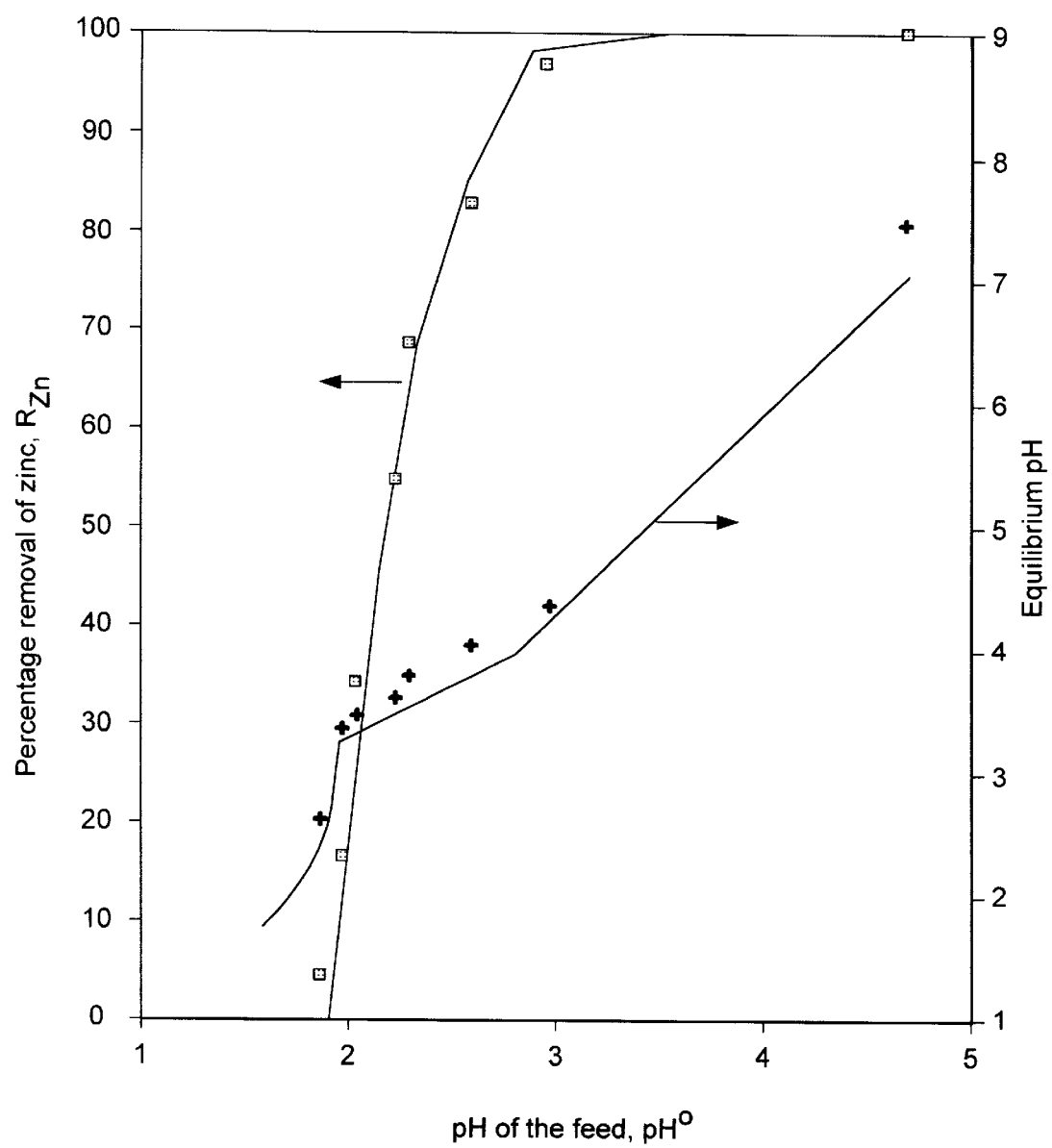

FIG. 12: Effect on feed pH on the removal of zinc, and the equilibrium pH using sodium di-(-n-octyl)phosphinate.

$C_{Zn}^{o}$=6.3 mM
$r_L^{o}$=2.12
$C_{Pb}^{o}=C_{Cd}^{o}=C_{Ca}^{o}=C_{Na}^{o}=C_{Cl}^{o}$=0

Figure 13:
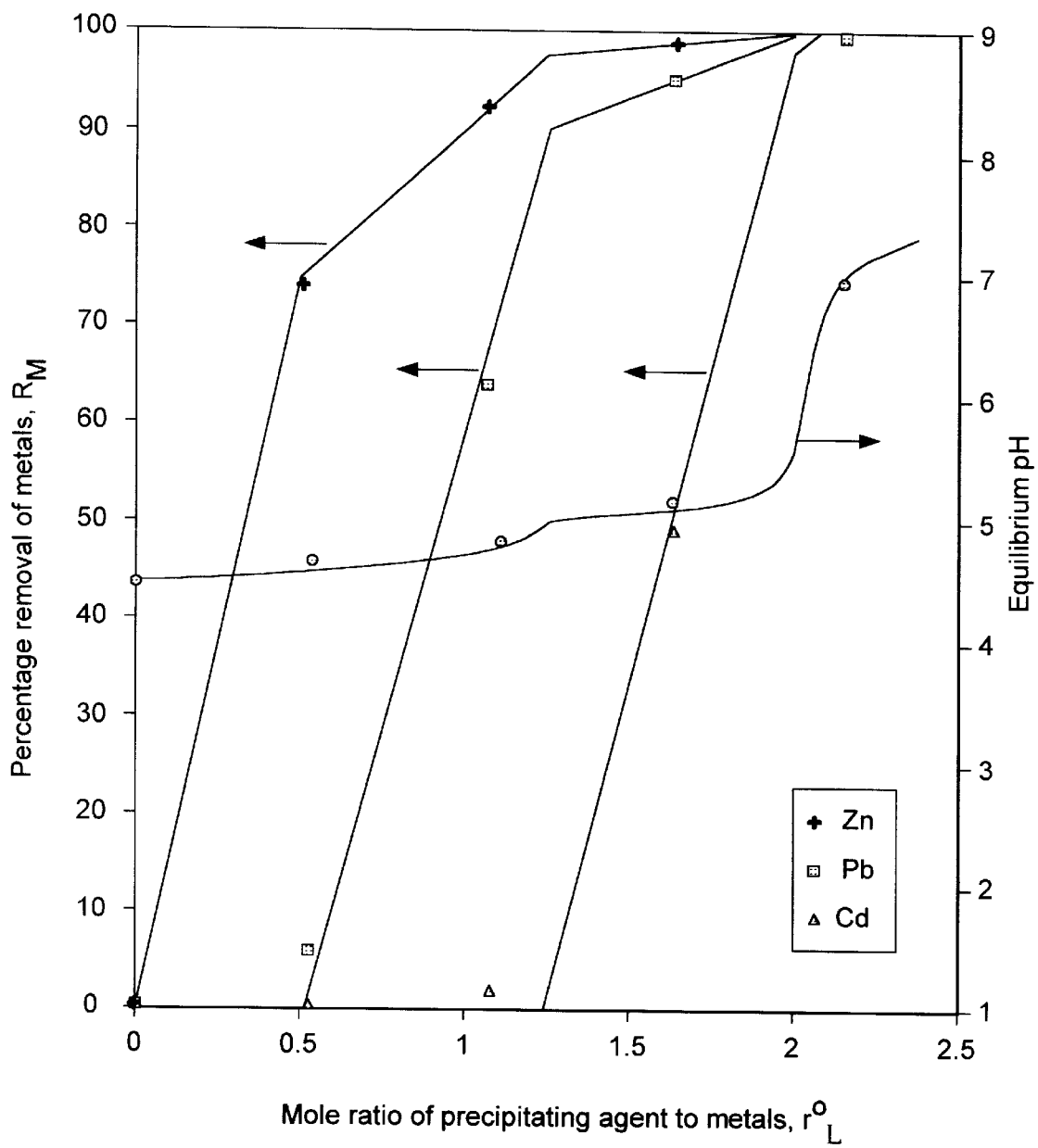

FIG. 13: Effect of mole ratio of sodium di-(n-octyl) phosphinate to mixture of Pb, Cd, and Zn on the removal of metals, and the equilibrium pH.

$C_{Pb}^{o}$=2.0 mM, $C_{Cd}^{o}$=2.0 mM, $C_{Zn}^{o}$=2.1 mM, pH°=4.3, $C_{NO_3}$=12.2 mM

Figure 14:
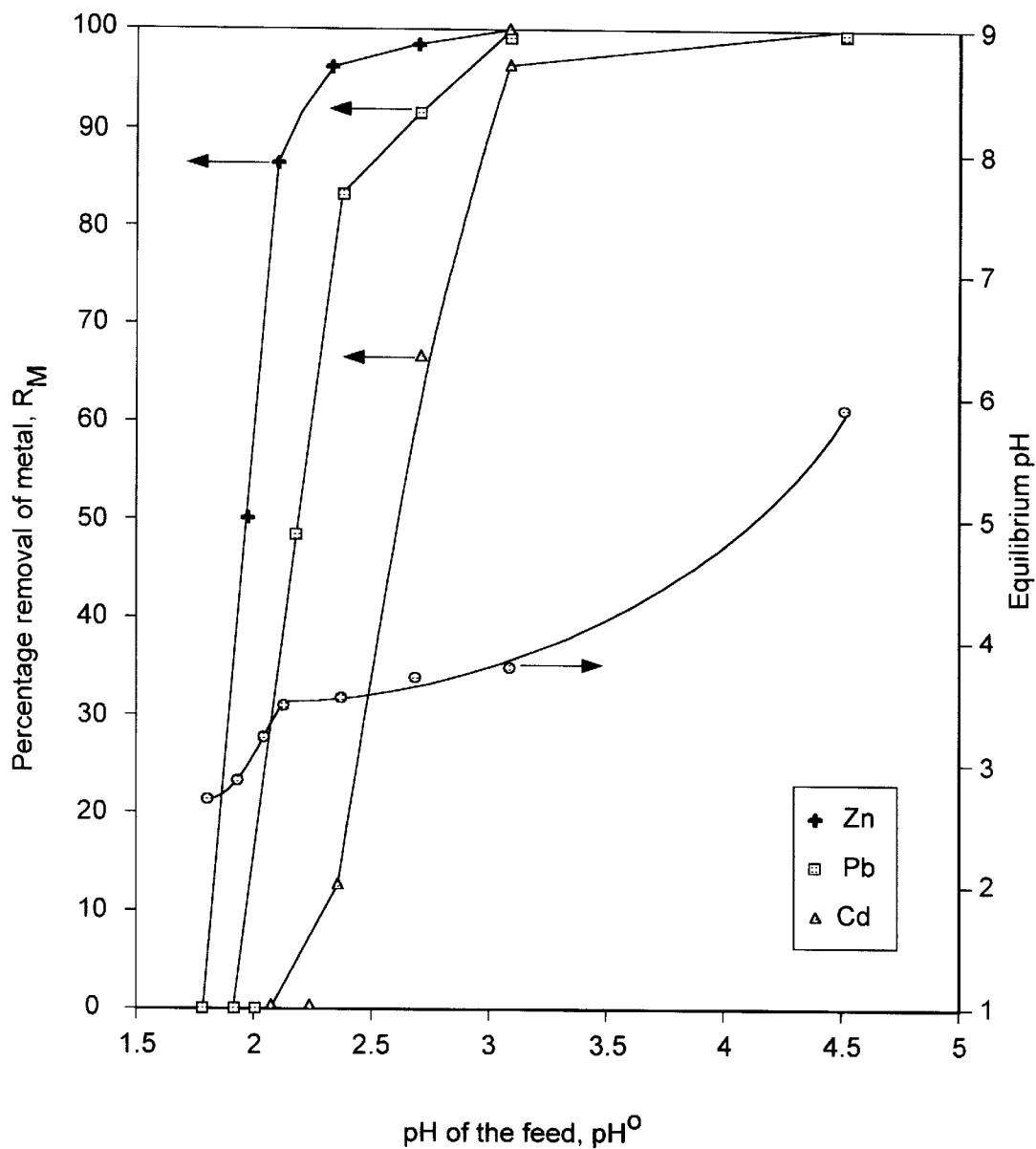

FIG. 14: Effect of feed pH on the removal of mixture of Pb, Cd, and Zn and the equilibrium pH using sodium di-(n-octyl)phosphinate.

$C_{Pb}^{o}$=2.0 mM, $C_{Cd}^{o}$=2.0 mM, $C_{Zn}^{o}$=2.1 mM,
$r_L^{o}$=2.2
$C_{Ca}^{o}=C_{Na}^{o}=C_{Cl}^{o}$0

DETAILED DESCRIPTION OF THE PREFERRED EMBODIMENT

Before describing the present invention in detail, it is to be understood that the invention is not limited in its application to the details of construction and parts illustrated in the accompanying drawings and described herein. The invention is capable of other embodiments and of being practiced in various ways. It is also to be understood that the phraseology or terminology used herein is for the purpose of description and not limitation.

The present invention provides a method for the removal of lead, cadmium, zinc or mixtures thereof from aqueous streams by precipitation by organophosphorus compounds selected from sodium di-(n-octyl) phosphinate and sodium di-(n-dodecyl)phosphinate. The method comprising the steps of:
a) contacting the aqueous effluent with a organophosphorus salt selected from sodium di-(n-octyl)phosphinate and di-(n-dodecyl)phosphinate or mixtures thereof;
b) achieving precipitation of said soluble metal species by reaction with said organophosphorus salts to yield a precipitate; and
c) recovering said precipitate by filtration.

Preferably, the mole ratio of organophosphorus salt is about 1.5 to 2.5 and most preferably about 2, in relation to the total mole ratio of the said soluble metal species.

Preferably, prior to step a), the pH of the aqueous effluent to be treated is adjusted to at least about 3 and most preferably at least about 4.

Advantageously, the organophosphorus salt may be regenerated from the precipitate by treating the precipitate with concentrated aqueous sodium hydroxide to dissolve it and in then contacting the resulting solution with diethyl ether to extract the organophosphorus salt, followed by evaporation of the diethyl ether solvent.

In Part I of this disclosure, the method of the present invention is demonstrated for the precipitation and removal of lead with sodium di-(n-octyl) phosphinate and sodium di-(n-dodecyl)phosphinate. In Part II, the method is demonstrated for the precipitation of lead, cadmium and zinc with sodium di-(n-octyl) phosphinate. It is to be understood that the method is not restricted to the examples provided herein and covers the use of either sodium di-(n-octyl) phosphinate or sodium di-(n-dodecyl)phosphinate for the precipitation of lead, cadmium, zinc or any mixtures thereof found in aqueous streams.

Part I

Precipitation and Removal of Lead with Sodium di-(n-octyl) phosphinate and Sodium di-(n-dodecyl) phosphinate Synthesis of di-(n-octyl) and di-(dodecyl) phosphinates Two compounds, di-(n-octyl) and di-(dodecyl) phosphinic acids, were synthesized and purified, and converted to their sodium salts. Di-(n-alkyl) phosphinic acid was synthesized by the peroxide catalyzed reaction between the corresponding 1-alkene and hypophosphorus acid following the procedure described by Williams and Hamilton [R. Williams and L. Hamilton, Di-n-alkyl Phosphine Oxides. I. Synthesis, J. Am. Chem. Soc., 74 (1952) 5418], as modified by Peppard et al . [D. Peppard, G. Mason and S. Lewey, Di-n-octyl Phosphinic Acids as a selective Extractant of Metallic Cations, J. Inorg. Nucl. Chem., 27 (1965) 2065], the disclosures of which are incorporated herein by reference.

The experiments were carried out at 22±1° C. Feed solution (35 ml) at a certain pH containing lead and/or calcium, and nitrate or chloride was treated with an aqueous solution (5 ml) of the precipitating agent. All solutions were prepared with distilled water.

The pH adjustment of the solution was made before the precipitation by addition of aqueous $HNO_3$ or HCl. The samples were shaken in tightly closed jars and then left to reach equilibrium. The equilibrium was tested by analyzing the system at different times (5 minutes, 30 minutes, one hour, 2 hours, one day, 2 days, and one week) and the same results were obtained. At equilibrium, two phases existed: a white precipitate and a clear aqueous phase. The two phases were separated using Fisher brand fast flow filter paper.

After phase separation, the equilibrium pH was measured using a Ω Metrohm 691 pH Meter (Ω Metrohm, Herisau, Switzerland ). The metal content of the filtrate was determined by atomic absorption spectrometry using a Thermo Jarrel Ash model SH 11 (Thermo Jarrell Ash, Waltham, Mass.) atomic absorption spectrophotometer. The wavelengths were 283.3 and 422.7 nm for lead and calcium, respectively. For concentrations below 1 ppm, the metal content was measured by an Inductively Coupled Plasma using a Thermo Jarrel Ash Trace Scan (Thermo Jarrell Ash, Waltham, Mass.) axial torch sequential ICP. The wavelength used for lead was 220.3 nm. The sensitivity of the inductively coupled plasma instrument is higher by at least 10 times than that of the atomic absorption spectrophotometer. The concentration of the precipitating agent in the aqueous phase was measured by a Dohrmann DC-183 Total Carbon Analyzer (Dohrmann, Santa Clara, Calif.), in combination with a Dohrmann DC-85 NDIR Detector module.

After separating the precipitate from the aqueous phase, the precipitating agent was regenerated by adding 3M NaOH solution to the precipitate, followed by contact with diethylether in a separation funnel. After agitation and subsequent phase disengagement, two phases were present. The lower phase was an aqueous phase containing the metal with a concentration higher than that of the feed. The upper phase was the ether solution of the precipitating agent. The ether was evaporated, and sodium di-(n-alkyl) phosphinate was regenerated. The regenerated compound was then analyzed for lead content using the atomic absorption instrument.

For the measurement of the solubility product of the precipitates, the precipitates were washed with distilled water and then left to equilibrate in aqueous solution. The lead content of the liquid phase was then determined as described above.

Experimental Results

At least three replicates were prepared for each experiment. The maximum values of the 95% confidence interval for the percentage removals of metal, the percentage loss of precipitating agent, and the equilibrium pH, were: ±3%, ±2%, and ±0.2, respectively. The concentrations of the species are reported in molarity and/or parts per million by mass.

The data are presented as the percentage removal of the lead, the percentage loss of the precipitating agent in the treated solution and the equilibrium pH. The percentage removal of lead, $R_{Pb}$, is defined as:

$$R_{Pb} = \frac{C_{Pb}^* - C_{Pb}}{C_{Pb}^*} \times 100 \quad [1]$$

where $C_{Pb}$ is the equilibrium concentration of lead in the treated solution, and $C_{Pb}^*$ is the total concentration of lead in a solution containing the initial moles of lead in the total volume of the treated solution, i.e. 40 ml.

The percentage loss of the precipitating agent; $L_L$, is defined as:

$$L_L = \frac{C_L}{C_L^*} \times 100 \quad [2]$$

where $C_L$ is the equilibrium concentration of the precipitating agent in the treated solution, and $C_L^*$ is the total concentration of the precipitating agent in a solution containing the initial moles of the precipitating agent in the total volume of the treated solution. In the figures, the data are shown as symbols and the lines are results obtained with a mathematical model. Subsequently, the superscript ° will be used for the properties of the feed to distinguish them from the values at equilibrium.

Figure 1:
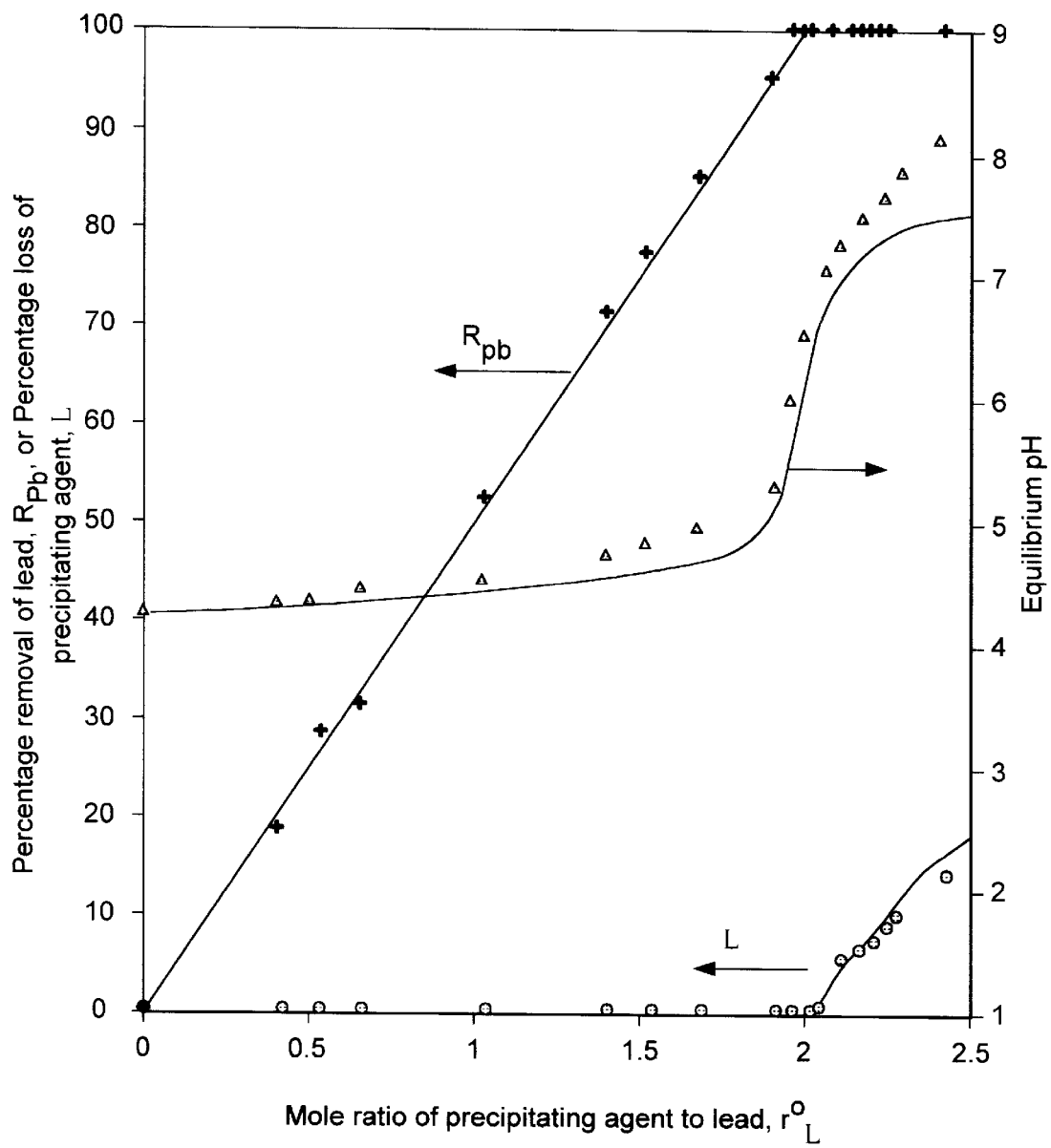
FIG. 1: Effect of mole ratio of sodium di-(n-octyl) phosphinate to lead on the removal of lead, the loss of precipitating agent, and the equilibrium pH.

The percentage removal of lead and the percentage loss of the precipitating agent are shown in FIG. 1 for a feed solution of 5.5 mM (1140 ppm) lead, at pH°=4.2, treated with sodium di-(n-octyl) phosphinate at different mole ratios of the precipitating agent to lead. The removal of lead increased linearly up to a value of the mole ratio of two. At a mole ratio of two, the highest percentage removal with the lowest loss of precipitating agent was observed. The equilibrium concentrations of the lead and of the precipitating agent, within the 95% confidence interval, at this point were, 0.13±0.04 ppm, 4.5±0.1 ppm, respectively. Higher mole ratio increased the loss of the precipitating agent, but had no noticeable effect on the percentage removal of lead. Based on these results, the following reaction is believed to describe the precipitation:

$$Pb^{2+} + 2L^- \longleftrightarrow PbL_{2(s)} \quad [R1]$$

When lead nitrate is added to water at pH ~7, a lower pH results due to the following reactions:

$$Pb^{2+} + nOH^- \longleftrightarrow Pb(OH)_n^{2-n} \quad [R2]$$

$$nH_2O \longleftrightarrow nH^+ + nOH^- \quad [R3]$$

where n=1, 2, 3, and 4.

The ion $Pb^{2+}$ forms hydroxo-complexes, reaction R2, and the consumption of $OH^-$ displaces to the right the ionization reaction of water, reaction R3. The net result is a production of free protons which is reflected in a decrease of pH. Thus, aqueous solutions of lead nitrate are acidic and, conversely, the precipitation of lead from a lead nitrate solution tends to increase the pH of the solution.

As shown in FIG. 1, when precipitating agent was added to a solution of lead nitrate, an increase in the mole ratio of the precipitating agent to lead caused a small increase in the equilibrium pH up to a mole ratio of 2, due to the precipitation of lead. The sudden increase in pH at mole ratios above 2, was due to the formation of di-(n-octyl) phosphinic acid:

$$H^+ + L^- \longleftrightarrow HL_{(s)} \quad [R4]$$

FIG. 2 shows the percentage removal of lead and the equilibrium pH, as a function of the mole ratio of the precipitating agent to lead, $r_L^o$, for three feed concentrations of lead: 0.46 mM (95 ppm); 5.50 mM (1140 ppm); and 10.62 mM (2200 ppm).

For a fixed value of $r_L^o$, the percentage of lead removed was found to be independent of the initial concentration of lead.

On the other hand, for values of $r_L^o$ less than two, the equilibrium pH was different for the three initial concentrations of lead. As discussed above, due to reactions [R2] and [R3] the pH is lower for solutions with higher lead concentration. As the ratio of precipitating agent to lead was increased and lead was precipitated, the equilibrium pH of the solutions increased and became the same for the three solutions when all lead present was precipitated at $r_L^o=2$. Above $r_L^o=2$, the increase in the equilibrium pH with increasing the lead concentration of the feed was caused by the increase of the amount of the precipitating agent added, which caused an increase of the amount of $HL_{(s)}$ formed, by the reaction [R4].

Effect of pH of the Feed

The effect of decreasing the pH of the feed, $pH^o$, from 4.2 to 1.3 by adding $HNO_3$ is shown in FIG. 3. The concentration of lead in the feed was 7.1 mM (1460 ppm), and the mole ratio of the precipitating agent to lead ($r_L^o$) was 2.0. Decreasing $pH^o$ decreased the percentage removal of lead and the equilibrium pH. Results show that advantageously, the pH of the feed should be set above 3 and most preferably above 4.

It is surmised that the decrease in percentage removal of lead was due to the competition between lead and hydrogen ions for the ligand $L^-$, and the precipitation of the acid form ($HL_{(s)}$) according to reaction [R4]. The decrease in the equilibrium pH was caused by the free acid left in the system. The equilibrium pH was higher than the pH of the feed due to the precipitation of the acid, reaction [R4].

Three sets of feed samples having the same lead concentration 6.75 mM (1400 ppm), and $pH^o$ values of 4.1, 1.9, and 1.6, respectively, were compared at different mole ratios of precipitating agent to lead. No acid was added to the first set, and the initial pH of the other two was adjusted by adding $HNO_3$. The mole ratio of the precipitating agent to lead, $r_L^o$, was varied from 0 to 6.4. The percentage removal of lead and the equilibrium pH are plotted versus $r_L^o$ in FIG. 4-a. The lines in this figure simply join the experimental points. Because of low hydrogen concentration in the first set of samples ($pH^o=4.1$), only lead was precipitated as $PbL_{2(s)}$ according to reaction [R1], and the largest percentage removal of lead was obtained at $r_L^o=2.0$. Addition of acid to the other sets ($pH^o=1.9$, and $pH^o=1.6$), reduced the removal of lead because some acid precipitated as $HL_{(s)}$, following reaction [R4]. The largest percentage removal of lead for each set was obtained at different $r_L^o$; the lower the pH, the higher the value of $r_L^o$ required to produce the maximum removal.

For the third set ($pH^o=1.6$), the behavior of the system may be divided into three regions. In the first region, from $r_L^o=0$ up to $r_L^o=3.2$, no lead was removed and all the precipitating agent was precipitated as $HL_{(s)}$, thus causing an increase in the pH. In the second region, from $r_L^o=3.2$ to $r_L^o=5.0$, only $PbL_{2(s)}$ was precipitated, and the increase in pH resulted from the dissociation of hydroxo-complexes caused by the decrease in lead concentration, reaction [R2]. In the third region, $r_L^o>5.0$, $HL_{(s)}$ precipitated again and the excess precipitating agent remained in the aqueous phase. For the set at $pH^o=4.2$, for which no acid was added, the precipitation of lead started with the addition of precipitating agent and only two regions were present, as FIG. 4-b shows.

Effect of Chloride in the Feed

Chloride, which is present in most water streams, forms soluble chloro-complexes with lead:

$$Pb^{2+} + nCl^- \longleftrightarrow PbCl_n^{2-n} \qquad [R5]$$

where n=1, 2, 3, and 4. The effect of chloride concentration on the removal of lead was investigated by adding sodium chloride to the feed solution. A feed solution of 6.85 mM (1420 ppm) lead, added as $PbCl_2$, at $pH^o=4.0$, was treated with precipitating agent at $r_L^o=2.0$. The mole ratio of chloride to lead ($r_{Cl}^o$) was increased from 2 to 250.

The chloride system was compared to the nitrate system where $Pb(NO_3)_2$ was the source of the lead and the nitrate concentration was increased with $NaNO_3$. The initial pH was adjusted using HCl or $HNO_3$, depending on the case.

As shown in FIG. 5, there was no significant difference in the percentage removal or in the equilibrium pH in these two systems. Increasing $r_{Cl}^o$ or $r_{NO_3}^o$ decreased slightly the percentage removal of lead and increased slightly the equilibrium pH. The decrease in the percentage removal was caused by the effect of the added electrolyte on the solubility of the precipitate. For a weak electrolyte (such as $PbL_{2(s)}$), an increase in the ionic strength of the system, by addition of another electrolyte which does not contain a common ion ($Pb^{2+}$ or $L^-$), decreases the mean ionic activity coefficient and increases the degree of dissociation of the electrolyte, i.e. the solubility. In addition, the decrease in the percentage removal of lead may be caused by the increased concentration of $Na^+$ which competed with $Pb^{2+}$ for $L^-$ and shifted the following reaction to the left forming NaL(S) precipitate:

$$NaL_{(s)} \longleftrightarrow Na^+ + L^- \qquad [R6]$$

Also, the increase in the ionic strength of the solution reduced the activity coefficient of the hydrogen and hence increased the pH.

The effect of chloride concentration on the removal of lead was also investigated by adjusting the chloride concentration with a solution of HCl. Lead chloride was used as the source of lead. The chloride system was again compared with a similar nitrate system, where lead nitrate was used as the source of the lead and $HNO_3$ solution was used to adjust the nitrate concentration. In each system, a feed of 7.0 mM (1440 ppm) lead was treated with a precipitating agent solution at $r_L^o=2.0$. FIG. 6 shows the percentage removal of lead and the equilibrium pH plotted versus $r_{Cl}^o$ or $r_{NO_3}^o$. Both systems gave the same percentage removal and equilibrium pH. Decreasing the pH of the feed decreased the percentage removal and the equilibrium pH.

Effect of Calcium in the Feed

Effective removal methods must be selective for the target metal against the alkaline earth metals, such as calcium, which are present in most water streams. If calcium competes with lead, some of the precipitating agent may combine with calcium, forming $CaL_{2(s)}$:

$$Ca^{2+} + 2L^- \longleftrightarrow CaL_{2(s)} \qquad [R7]$$

The effect of the mole ratio of the precipitating agent to lead on the removal of lead, the removal of calcium, and the equilibrium pH was investigated at a mole ratio of calcium to lead in the feed of $r_{Ca}^o=1.0$ by adding $Ca(NO_3)_2$. The concentration of lead in the feed was 10 mM (2070 ppm) at pH°=4.3, and the mole ratio of the precipitating agent to lead was varied from $r_L°=0$ to $r_L°=2.75$. FIG. 7 shows that only lead was precipitated up to $r_L°=2.0$, at which the largest percentage removal of lead was obtained. Increasing $r_L°$ above 2 increased the equilibrium pH and the percentage removal of calcium, as $HL_{(s)}$ and $CaL_{2(s)}$ formed. The effect of increasing calcium concentration on the removal of lead was investigated by adding $Ca(NO_3)_2$ to a feed solution containing 10 mM (2070 ppm) lead at pH°=4.5. The mole ratio of precipitating agent to lead was constant at 1.1 while the mole ratio of calcium to lead ($r_{Ca}°$) was increased from 0 to 2.5. The presence of calcium had no detectable effect on the removal of lead in the range of concentrations under study.

Effect of the Chain Length of the Precipitating Agent

The effect of the chain length of the precipitating agent on the removal was studied by treating feed solutions containing 4.97 mM (1030 ppm) lead at pH°=4.1 with sodium di-(n-dodecyl) phosphinate and with sodium di-(n-octyl) phosphinate. In both systems, the mole ratio of the precipitating agent ($r_L°$ or $r_{L_D}°$) was varied from 0 to 2.9.

FIG. 8 shows the percentage removal of lead and the equilibrium pH as a function of the mole ratio of the precipitating agent to lead. Both precipitating agents gave almost the same the percentage removal and equilibrium pH, thus, the precipitation reaction with sodium di-(n-dodecyl) phosphinate is:

[R8]

The principal difference between the two precipitating agents was in the residual concentrations of lead and precipitating agent at $r_L°=r_{L_D}°=2.0$. At this mole ratio, the equilibrium concentrations of the lead and the precipitating agent in the aqueous phase were 0.15±0.05 ppm and 4.5±0.2 ppm, respectively for di-(n-octyl) phosphinate, and 0.05±0.02 ppm and 6.5±0.4 ppm, respectively for di-(n-dodecyl) phosphinate.

The increase in the chain length of the precipitating agent increased the stability of the precipitate, hence the solubility of lead was decreased. Although the ppm of di-(n-dodecyl) phosphinate are larger than those of di-(n-octyl) phosphinate compound, its solubility on molar basis is smaller. For the same hydrophilic group, increasing the number of carbon atoms in the hydrophobic group, increases the intermolecular forces between the chains, and decreases the solubility of the compound in water.

Regeneration of the Precipitating Agent

To regenerate the precipitating agent, concentrated aqueous sodium hydroxide was added to the precipitate to dissolve it, and then the aqueous solution was contacted with diethyl ether to extract the precipitating agent. At high pH, the hydroxyl ions compete with the precipitating agent for lead and forms the hydroxo-complexes, $Pb(OH)_{2(s)}$, $Pb(OH)_3^-$, and $Pb(OH)_4^{2-}$, while the sodium competes with lead for the di-(n-octyl) phosphinic anions. Only the sodium di-(n-octyl) phosphinate is soluble in ether. The agent was then recovered by evaporating the ether. The regeneration process is described below.

The precipitate ($PbL_{2(s)}$) was formed by adding 50 ml of a 200 mM of sodium di-(n-octyl) phosphinate solution to one liter of a 5 mM lead nitrate solution. The lead di-(n-octyl) phosphinate precipitate was separated and then dissolved in 10 ml of 3M NaOH. The resulting solution was contacted with 100 ml of diethyl ether in a separation funnel and agitated vigorously. Two phases were formed and the lower (aqueous) phase containing the lead was separated. The upper phase (ether) phase containing the precipitating agent, was left to evaporate. No lead was detected by analysis of aqueous solutions of the regenerated precipitating agent showing the insolubility of lead di-(n-octyl) phosphinate in diethyl ether. Over 99% of the precipitating agent added to the feed lead solution was regenerated and recovered sodium di-(n-octyl) phosphinate. The volume of the aqueous solution containing the lead in different forms, was about 10 ml, which means that the concentration of lead was increased 100 times, over that of the feed.

Part II

Precipitation and Removal of Lead, Cadmium and Zinc with Sodium di-(n-octyl) phosphinate Sodium di-(n-octyl) phosphinate (NaL), synthesized as described in Part I, was used as a precipitating agent to remove heavy metals from aqueous nitrate solutions containing lead, cadmium, zinc or mixtures thereof. Cadmium, zinc and mixture of lead, cadmium and zinc were precipitated in the form of $PbL_{2(s)}$, $CdL_{2(s)}$, and $ZnL_{2(s)}$.

Lowering the pH of the feed solution reduced the removal of the metals as some of the phosphinate precipitated in the acid form as $HL_{(s)}$. The removal of lead, cadmium, and zinc, from a solution containing the three metals gave a selectivity in the following order: Zn>Pb>Cd.

Experimental Results

At least three replicates were run for each experiment. The maximum values of the 95% confidence intervals for the percentage removals of metal, the percentage loss of precipitating agent, and the equilibrium pH, were, ±3%, ±2%, and ±0.2, respectively. The concentrations of the species are expressed in molarity and/or parts per million by mass.

The data are presented in terms of percentage removal of the metal, percentage loss of the precipitating agent, and equilibrium pH versus each of the independent variables. The percentage removal of the metal is defined as:

$$R_i = \frac{C_i^* - C_i}{C_i^*} \times 100 \quad [1]$$

where I stands for lead, cadmium or zinc. The percentage loss of the precipitating agent; $L_L$, is defined as:

$$L_L = \frac{C_L}{C_L^*} \times 100 \quad [2]$$

Removal of Lead

The results obtained from the study of the removal of lead are provided in Part I, above.

Removal of Cadmium

A feed solution of 5.9 mM (660 ppm) cadmium at pH°=4.7 was treated with sodium di-(n-octyl) phosphinate. Cadmium nitrate was used as the source of cadmium. The mole ratio of the precipitating agent to cadmium was varied from $r°=0$ to $r°=2.8$.

The percentage removal of cadmium and the equilibrium pH are shown in FIG. 9 for different mole ratios of the precipitating agent to cadmium. Behavior similar to that of lead was observed, where the percentage removal of cadmium increased linearly with an increase in the mole ratio up to $r_L°=2.0$.

The highest percentage removal with the lowest loss of the precipitating agent occurred at $r_L°=2.0$. At this mole ratio, the equilibrium concentrations of the cadmium and the precipitating agent were 0.24±0.03 ppm, and 4.5±0.3 ppm, respectively. Similar to the case of lead, the stoichiometry of the overall precipitation reaction is $$Cd^{2+} + 2L^- \longleftrightarrow CdL_{2(s)} \qquad [R9]$$

The equilibrium pH increases with increasing mole ratio of the precipitating agent to cadmium. The small increase in pH below $r_L^\circ = 2$, was due to dissociation of the hydroxo-complexes of cadmium according to the reaction:

$$Cd^{2+} + nOH^- \longleftrightarrow Cd(OH)_n^{2-n} \qquad [R10]$$

where n=1 or 2. The larger increase in pH at $r_L^\circ > 2.0$ was caused by the formation of di-(n-octyl) phosphinic acid as given by reaction [R4].

The effect of pH of the feed (pH$^\circ$) on the removal of cadmium and on the equilibrium pH was also investigated. The pH of the feed was decreased from 4.7 to 1.7 by adding nitric acid. A feed solution containing 5.9 mM (660 ppm) cadmium was treated with the precipitating agent at a mole ratio $r_L^\circ = 2.2$. The percentage removal and the equilibrium pH are plotted in FIG. 10 against the pH of the feed. The percentage removal and the equilibrium pH decreased with decreasing pH of the feed because some of the ligand precipitated as $HL_{(s)}$, thus reducing the removal of cadmium, and decreasing the equilibrium pH due to the presence of excess free acid. The equilibrium pH was higher than the pH of the feed because hydroxo-complexes dissociated by reaction [R10].

Removal of Zinc

Zinc was removed from a feed solution of 6.3 mM (410 ppm) zinc at pHo=4.6 by sodium di-(n-octyl) phosphinate. The mole ratio of the precipitating agent to zinc was varied from $r_L^\circ = 0$ to $r_L^\circ = 2.65$.

FIG. 11 shows the percentage removal of zinc and the equilibrium pH plotted against the mole ratio of the precipitating agent to zinc. A behavior similar to that of lead and cadmium was observed.

The removal of zinc increased linearly with the mole ratio up to $r_L^\circ = 2.0$. The highest percentage removal of zinc with lowest percentage of loss of the precipitating agent was obtained at $r_L^\circ = 2.0$. At this point, the equilibrium concentrations of zinc and the precipitating agent were 0.08±0.02 ppm, and 4±1 ppm, respectively. Again, the stoichiometry of the overall precipitation reaction is:

$$Zn^{2+} + 2L^- \longleftrightarrow ZnL_{2(s)} \qquad [R11]$$

The equilibrium pH increased with increasing $r_L^\circ$. The increase in the pH between $r_L^\circ$ and $r_L^\circ = 2$ was caused by the dissociation of hydroxo-complexes of zinc in reaction:

$$Zn^{2+} + nOH^- \longleftrightarrow Zn(OH)_n^{2-n} \qquad [R12]$$

where n=1,2. At $r_L^\circ > 2$, di-(n-octyl) phosphinic acid was formed, yielding a large increase in equilibrium pH.

A feed solution containing 6.3 mM (410 ppm) zinc was treated with the precipitating agent at mole ratio $r_L^\circ = 2.12$. The feed pH was adjusted from 4.6 to 1.7 with $HNO_3$.

FIG. 12 shows the effect of pH$^\circ$ on the percentage removal of zinc and on the equilibrium pH. Again, the percentage removal and the equilibrium pH decreased with decreasing pH$^\circ$ because some of the added phosphinate precipitated as $HL_{(s)}$.

Treatment of a Feed Containing Lead, Cadmium, and Zinc

A feed solution containing 2.0 mM (420 ppm) lead, 2.0 mM (220 ppm) cadmium, and 2.1 mM (140 ppm) zinc, at pH$^\circ$=4.3 was treated with sodium di-(n-octyl) phosphinate. The mole ratio of the precipitating agent to the total number of moles of metals was varied up to $r_L^\circ = 2.7$.

The percentage removal of each metal and the equilibrium pH are shown in FIG. 13 for different mole ratios. The percentage removal of each metal and the equilibrium pH increase with increasing mole ratio up to $r_L^\circ = 2$. In this range of mole ratios, the percentage removal of zinc is the highest, followed by lead and cadmium. At a mole ratio of 2.0, the maximum percentage removal of each metal with the lowest percentage loss of the precipitating agent was obtained. Increasing the mole ratio above 2 had no effect on the removal but increased the loss of the precipitating agent.

The effect of the pH of the feed on the removal of lead, cadmium and zinc from the same metal feed at $r_L^\circ = 2.2$ is shown in FIG. 14. The pH of the feed was decreased from 4.3 to 1.7 with nitric acid. As for the solutions containing a single metal, the percentage removal of each metal and the equilibrium pH decreased with decreasing pH$^\circ$.

The selectivity of the ligand for the three metals is in the order:

Zn>Pb>Cd

The preference of the precipitating agent for a particular ion among others present in a solution depends both on the precipitating agent and the ion. Metal ions exist in aqueous solution with a certain number of water molecules bound to them. The larger the ionic radius, the smaller the hydrated radius and the lower the hydration energy.

A model based on the measured solubility products of the precipitates and literature data for stability constants of the other reactions was developed. The results of the model were in good agreement with the experimental results.

Although the invention has been described above with respect with one specific form, it will be evident to a person skilled in the art that it may be modified and refined in various ways. It is therefore wished to have it understood that the present invention should not be limited in scope, except by the terms of the following claims.

What is claimed is:

1. A method for the removal of soluble metal species consisting of lead, cadmium, zinc and mixtures thereof, present in an aqueous effluent, said method comprising the steps of:
    (a) contacting the aqueous effluent with a organophosphorus salt selected from sodium di-(n-octyl) phosphinate and sodium di-(n-dodecyl)phosphinate or mixtures thereof;
    (b) achieving precipitation of said soluble metal species by reaction with said organophosphorus salts to yield a precipitate;
    (c) recovering said precipitate by filtration.

2. The method of claim 1 wherein said organophosphorus salt is present in a mole ratio of about 1.5 to 2.5 in relation to the total mole ratio of the said soluble metal species.

3. The method of claim 1 wherein said organophosphorus salt is present in a mole ratio of about 2.0 in relation to the total mole ratio of the said soluble metal species.

4. The method of claim 1 wherein prior to step a), the pH of the aqueous effluent to be treated is adjusted to at least about 3.

5. The method of claim 3 wherein prior to step a), the pH of the aqueous effluent to be treated is adjusted to at least about 4.

6. The method of claim 4 wherein prior to step a), the pH of the aqueous effluent to be treated is adjusted to at least about 4.

7. The method of claim 1 wherein after step c), there is added the additional step of regenerating said organophosphorus salt by treating said precipitate with concentrated aqueous sodium hydroxide to dissolve said precipitate and contacting the resulting solution with diethyl ether to extract the organophosphorus salt followed by evaporation of the diethyl ether.

8. The method of claim 7 wherein the concentrated aqueous sodium hydroxide is at a concentration of about 3M.

* * * * *